United States Patent [19]
Johnston

[11] Patent Number: 4,929,342
[45] Date of Patent: May 29, 1990

[54] APPARATUS AND METHOD FOR SEPARATING RECYCLABLE MATERIALS

[75] Inventor: Gerald Johnston, Vestaburg, Mich.

[73] Assignee: Lenco Machines & Tool Co., Vestabury, Mich.

[21] Appl. No.: 290,183

[22] Filed: Dec. 23, 1988

[51] Int. Cl.$^5$ .......................... B03C 1/30; B07B 15/00
[52] U.S. Cl. ......................................... 209/12; 209/38; 209/39; 209/44.1; 209/137; 209/139.1; 209/214; 209/215; 209/632; 209/636; 209/643; 209/930; 209/933
[58] Field of Search ................. 209/12, 30, 31, 34–39, 209/44.1, 44.2, 136–139.1, 147, 151, 629, 632, 633, 636, 643–645, 930, 933

[56] References Cited

U.S. PATENT DOCUMENTS

| | | |
|---|---|---|
| 3,572,503 | 3/1971 | Hezel .............................. 209/147 X |
| 3,595,389 | 7/1971 | Morgan . |
| 3,650,396 | 3/1972 | Gillespie et al. ........................ 209/3 |
| 3,749,240 | 7/1973 | Spears et al. ........................ 209/631 |
| 3,804,248 | 4/1974 | Talamantz . |
| 3,833,117 | 9/1974 | Mackenzie et al. . |
| 3,926,792 | 12/1975 | Buford . |
| 3,929,628 | 12/1975 | Denevi et al. ........................ 209/36 |
| 4,139,454 | 2/1979 | Larson .................................. 209/12 |
| 4,225,047 | 9/1980 | Grubman . |
| 4,257,511 | 3/1981 | Miller ................................ 209/39 X |
| 4,387,019 | 6/1983 | Dale et al. ............................. 209/12 |

FOREIGN PATENT DOCUMENTS

| | | | |
|---|---|---|---|
| 2420836 | 11/1975 | Fed. Rep. of Germany ........ 209/12 |
| 0135134 | 4/1979 | Fed. Rep. of Germany ........ 209/36 |
| 1520425 | 8/1978 | United Kingdom .................. 209/12 |

OTHER PUBLICATIONS

Lenco Machine & Tool Company Brochure, The Lenco 4-Row Self Propelled Potato Harvester, Date Unknown.

*Primary Examiner*—Margaret A. Focarino
*Assistant Examiner*—Edward M. Wacyra
*Attorney, Agent, or Firm*—Price, Heneveld, Cooper, DeWitt & Litton

[57] ABSTRACT

An apparatus for sorting recyclable materials including an inlet conveyor with a magnetic pulleys that directs magnetic objects out of the flow of recyclable materials. A vacuum inlet is positioned adjacent a stepped region of the conveyor so as to pull lighter weight materials out of the material flow. A size sorting conveyor separates larger objects from the smaller lighter weight objects, and heavier objects such as glass are conveyed to still another collecting region.

17 Claims, 2 Drawing Sheets

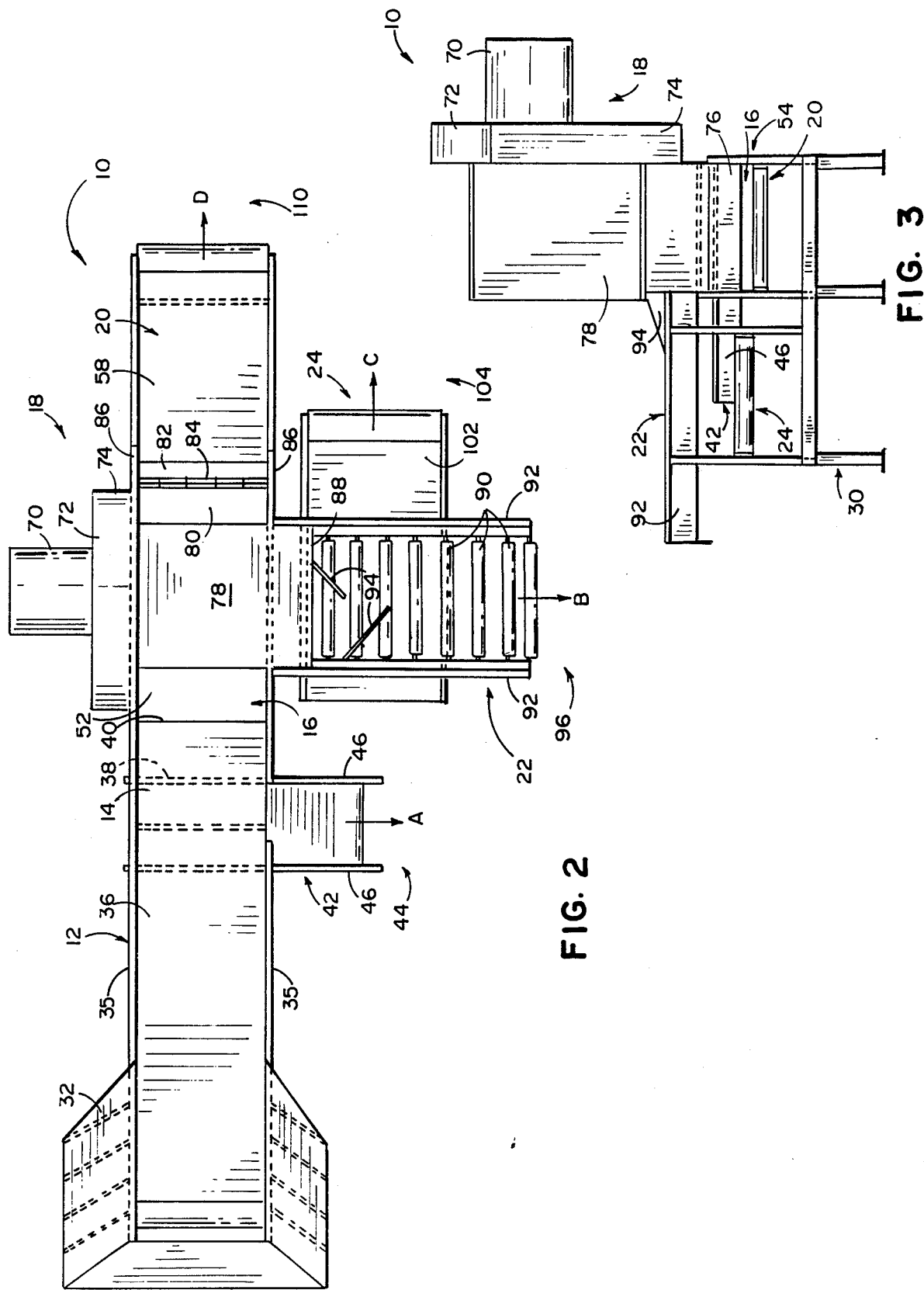

APPARATUS AND METHOD FOR SEPARATING RECYCLABLE MATERIALS

BACKGROUND OF THE INVENTION

The present invention relates to separating and sorting apparatus, and in particular to apparatus and method for separating recyclable materials.

Increasingly used beverage containers as well as other objects and materials are being recycled rather than discarded. Many states, for example, have enacted beverage container regulations which promote the recycling of containers, whether made of steel, aluminum, plastic or glass. Due to the difficulties of waste disposal and the increasing cost of certain raw materials, other materials are also recycled rather than being discarded.

A difficulty with the increased recycling of materials is the classification of the different types of materials. Frequently recycling collection points accumulate a mix of metal, plastic and glass objects. Since these different materials are often not separated, time consuming manual or mechanical sorting is required. This sorting expense reduces the profitability of commercial recycling operations. Heretofore a wide variety of separating apparatuses have been developed for separating trash and recyclable materials. Although many of these devices separate metallic from non-metallic objects, it is more beneficial to separate recyclable objects into additional categories of materials. It is also often difficult for unskilled workers to quickly recognize aluminum from other metal containers.

One such container classifying apparatus has provided a conveyor with a magnetic pulley as well as a fluid flow to separate empty containers. Such an apparatus in general utilizes air flow to direct the fall of empty containers into appropriate collecting bins or through an elongated conduit. Such an apparatus does not, however, segregate containers by size, and either requires a high vacuum flow through a conduit that operates adjacent the magnet or results in dirt and debris being blown off of the empty containers into the work area.

SUMMARY OF THE INVENTION

In a preferred form the invention is embodied in a recyclable material separating apparatus and method that includes a conveyor with a magnetic element that directs magnetic materials out of the recyclable material flow and a vacuum that is applied to the recyclable material flow in order to remove lighter materials such as aluminum and plastic, while heavier materials such as glass continue to be conveyed to a heavy material collecting point. The apparatus has a size separator mechanism which sorts the lighter materials. Preferably, the vacuum is applied at a stepped region of the apparatus conveying mechanism removed from the magnetic field zone, while the vacuum inlet opens into an enlarged chamber whereat the lighter materials are discharged onto a lighter material conveyor. Preferably, all of the sorted materials are conveyed in a controlled fashion to collecting points.

With the present invention magnetic materials such as steel cans are separated from non-magnetic materials, and lighter weight materials such as plastic and aluminum are separated from heavier materials such as glass. The lighter weight materials are separated by size into two categories, and the aluminum and plastic materials can thereafter be readily visually separated. The controlled conveying and enclosed vacuum chamber reduces the blowing of dirt and debris from the containers about the work area while the separation or categorizing of the materials occurs at separate stations and thus reduces the likelihood of error. These and other benefits, features and advantages of the invention will be understood by one skilled in the art with reference to the specification which follows and drawings appended hereto.

BRIEF DESCRIPTION OF THE DRAWINGS

FIG. 2 is a plan view of the apparatus of FIG. 1; and

FIG. 3 is a discharge end elevational view of the apparatus of FIG. 1.

DETAILED DESCRIPTION OF THE PREFERRED EMBODIMENT

Figure 1:
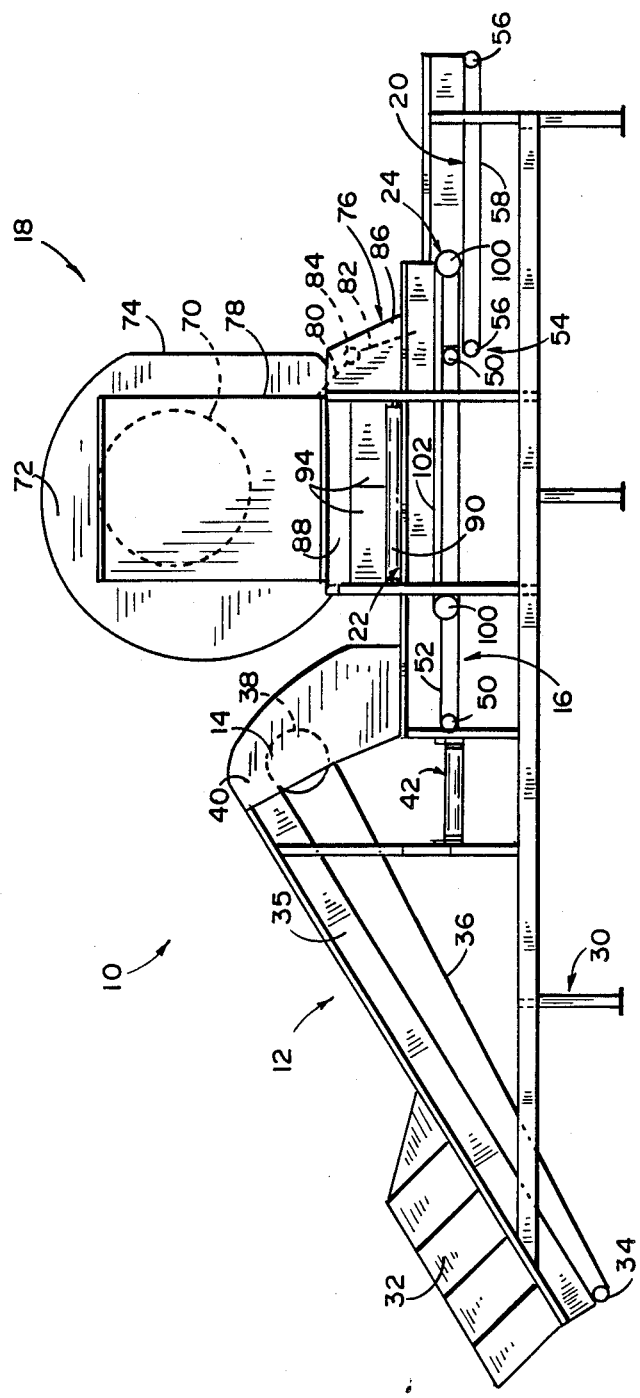
FIG. 1 is a front elevational view of a recyclable material separating apparatus embodying the present invention.

The present invention is embodied in a recyclable material separating or sorting apparatus, a preferred form of which is shown in FIGS. 1–3 and referenced generally by the numeral 10. Apparatus 10 includes an inlet conveyor 12 (FIG. 1) having a magnetic pulley 14 that is used in the separation of magnetic materials, such as steel containers. A vacuum conveyor 16 transports the remainder of the recyclable materials to a vacuum mechanism 18. Vacuum mechanism 18 is used to pull lighter weight materials such as aluminum and plastic from the flow of recyclable materials. A glass conveyor 20 transports heavier materials such as glass away from vacuum mechanism 18. Vacuum mechanism 18 discharges the lighter weight materials onto a size sorting conveyor 22, with smaller materials dropping down onto a small object conveyor 24 (FIG. 2).

Apparatus 10 includes a frame 30 which supports the various elements. At the lower end of inlet conveyor 12 is a hopper or bin 32 (FIGS. 1–2) into which the recyclable materials or objects are dumped for sorting. At the lower end of inlet conveyor 12 is a pulley 34, with a rubber conveyor belt 36 extending about magnetic pulley 14 and lower pulley 34. Raised inlet conveyor sidewalls 35 prevent objects from falling off conveyor 12. Most preferably inlet conveyor belt 36 is approximately thirty-six and a half inches wide, and three-sixteenths inch thick with rectangular ridges or panels extending upwardly from belt 36 to carry objects up the incline of conveyor 12. Magnetic pulley 14 is most preferably about twelve inches in diameter with rows of permanent magnets mounted inside to generate a magnetic field about the outer surface of pulley 14. The magnetic field extends through belt 36 to magnetically adhere magnetic materials, such as steel or other metals, to belt 36 proximate pulley 14. Most preferably pulley 14 is driven by a two horsepower electric motor with a conventional gear box and chain reduction (not shown). Belt 36 runs from lower pulley 34 up over the top of belt 14, around a discharge end 38 of conveyor 12 formed by pulley 14, and then down beneath magnetic pulley 14. As material is conveyed up inlet conveyor 12, non-magnetic material falls off discharge end 38 onto vacuum conveyor 16. As used herein non-magnetic material refers to aluminum, plastic, glass or other recyclable materials not affected by the magnetic field of magnetic pulley 14. A discharge hood 40 forms a shroud about discharge end 38 and prevents materials from bouncing or otherwise falling in an uncontrolled fashion off of vacuum conveyor 16.

As recyclable materials are conveyed along inlet conveyor 12, magnetic materials, such as steel containers and the like, adhere to belt 36 about magnetic pulley 14. The magnetic materials ar therefore pulled along the underside of inlet conveyor 12 until belt 36 is advanced down away from magnetic pulley 14. At the point where the magnetic material moves out of the magnetic field generated by magnetic pulley 14, the magnetic objects drop due to gravity down onto a magnetic material collecting conveyor 42. Magnetic material collecting conveyor 42 is therefore located beneath inlet conveyor 12 after magnetic pulley 14. Magnetic material collecting conveyor 42 transports the magnetic material laterally in the direction of arrow A (FIG. 2) to be discharged at a magnetic material collecting point 44. Preferably a collecting bin or the like (not shown) is placed at magnetic collecting point 43 so as to accumulate the separated metallic materials. Magnetic material collecting conveyor 42 is most preferably twenty-four and a half inches wide with raised sidewalls to prevent objects from falling off the sides of conveyor 42. Conveyor 42 is also most preferably driven by a three quarter horsepower electric motor and appropriate conventional gear box (not shown).

Vacuum conveyor 16 transports the remainder of the recyclable material horizontally along frame 30. Vacuum conveyor 16 has end pulleys 50 and preferably a rubber belt 52 thirty-six and a half inches wide. The discharge end of vacuum conveyor 16 is positioned immediately above the inlet end of glass conveyor 20 (FIG. 1) so as to form a stepped region 54 at the transition between conveyors 16 and 20. Glass conveyor 20 also includes a pair of end pulleys 56 and a belt 58. The vertical offset of vacuum conveyor 16 and glass conveyor 20 at stepped region 54 causes the conveyed materials to drop and impact on glass conveyor 20. This drop and impact causes the recyclable materials to separate and thus improves sorting and categorizing of the recyclable materials. Most preferably this drop is about four inches.

Vacuum mechanism 18 includes a vacuum motor 70 which drives a large fan or impeller 72 with an exhaust outlet 74. A vacuum head 76 or inlet is positioned adjacent stepped region 54 so as to induce or apply a vacuum at the impact region of glass conveyor 20. Vacuum head 76 includes a vertical opening into an enlarged chamber or plenum 78. An upper directing baffle 80 and a lower directing baffle 82 are joined by a hinge 84. Baffles 82 and 84 are adjustably mounted on frame 30 so as to hang down in front of the opening into plenum 78, and thus direct air flow from the impact region on conveyor 20 up into plenum 78. Side panels 86 block air flow around the sides of baffles 80, 82. The cascading of recyclable materials at stepped region 54 allows the materials to separate and thus lighter materials are not trapped by surrounding material flow as vacuum head 76 is passed.

Upon entering plenum 78 the recyclable objects drop onto size sorting conveyor 22. Size sorting conveyor 22 (FIG. 2) extends horizontally out through plenum discharge 88 so as to convey the lighter weight material laterally away from vacuum mechanism 18. Most preferably vacuum motor 70 is a seven and one quarter horsepower motor while impeller 72 is forty-eight inches in diameter. The opening at vacuum head 76 is thirteen inches high, and plenum 78 is forty-nine inches high, thirty-nine inches wide and extends forty-one inches along conveyor 16. Plenum discharge 80 is preferably about twelve inches high.

Sorting conveyor 22 is a roll conveyor having a series of spaced rods 90 (FIG. 2). Rods 90 are linked at each side by a narrow strip of rubber belting, but rods 90 are spaced to provide gaps of approximately 2.863 inches between adjacent rollers 90. Most preferably sorting conveyor is thirty and a half inches wide and rods 90 are about eleven millimeters in diameter. As lighter weight materials fall onto sorting conveyor 22, objects having a diameter or cross section sufficiently small enough to pass between rods 90 fall through sorting conveyor 22 and down onto small object conveyor 24. Sorting conveyor 22 includes raised side panels 92 that prevent objects from rolling off the sides of sorting conveyor 22. Extending from side panels 92 are angled diverter panels 94 or baffles that direct the transport of objects along sorting conveyor 22. Diverter panels 94 turn the conveyed objects so as to orient and align the object with the spacing between rods 90. This turning action causes objects that are elongated but have a small cross section to align with rods 90 and fall through to small object conveyor 24. Larger objects having a cross section too great to pass between rods 90 are conveyed in the direction of arrow B to a large, light weight material discharge point 96. A collecting bin or container (not shown) is preferably positioned at discharge point 96 so as to collect the large objects of lighter weight. Subsequently, the lighter objects may be readily sorted by visual inspection since plastic and aluminum are readily distinguishable.

Small object conveyor 24 includes end pulleys 100 and a belt 102. Although as shown in FIG. 1 end pulleys 100 have a larger diameter than end pulleys 50, this depiction is to distinguish the various conveyor elements. Preferably, end pulleys 100 are of the same diameter as end pulleys 50. Belt 102 is a rubber belt, preferably about thirty-six and a half inches wide, that transports small objects in the direction of arrow C parallel to vacuum conveyor 16 and glass conveyor 20. Smaller objects of lighter weight material are discharged from small object conveyor 24 at discharge point 104. Preferably a collecting bin or container is positioned at discharge point 104 so as to accumulate the smaller, lighter weight objects. Thereafter, the smaller, lighter weight objects can be sorted into plastic, aluminum and the like since the different materials are readily distinguishable.

Glass conveyor 20 is a rubber conveyor that transports the heavier materials, such as glass, in the direction of arrow D to a discharge point 110. Preferably a collecting bin or the like is positioned at discharge point 110 so as to accumulate the heavier glass materials.

With apparatus 10, vacuum head 76 is spaced well downstream of magnetic pulley 14 so that lighter weight objects are not separated from the remaining recyclable materials until after the magnetic materials have been separated. This reduces the likelihood that the applied vacuum will erroneously pull a magnetic object from magnetic pulley 14 and thus reduces the incidence of error in sorting materials. Further, vacuum head 76 opens into an enlarged, generally enclosed plenum 78 that prevents dirt and debris carried with the recyclable objects from being blown in an uncontrolled fashion about the work area. Exhaust outlet 74 may be appropriately filtered or screened to prevent the discharge of such debris. The recyclable objects or materials are all conveyed in a controlled fashion to collecting points, thus increasing the reliability of the sorting process.

It is to be understood that the above is a description of the preferred embodiment and one skilled in the art will recognize that improvements and modifications may be made without departing from the spirit of the invention enclosed herein. The scope of protection afforded is to be determined from the claims which follow and the breadth of interpretation that the law allows.

The embodiments of the invention in which an exclusive property or privilege is claimed are as follows:

1. An apparatus for separating recyclable materials, comprising:
   a frame;
   a conveying mechanism mounted on said frame and including a magnetic element thereon, said conveying mechanism adapted to convey a flow of said recyclable materials and said magnetic element disposed and adapted to direct magnetic materials out of said recyclable material flow;
   a vacuum inducing mechanism mounted on said frame and disposed adjacent said conveying mechanism so as to pull materials having a preselected lighter weight from said recyclable material flow, said vacuum inducing mechanism having a vacuum discharge region for discharging said lighter weight materials;
   a size separator mechanism disposed at said vacuum discharge region;
   said conveying mechanism having a heavy material collecting region, whereby said apparatus separates said metallic material from the remainder of said recyclable materials, said lighter weight materials such as aluminum, plastic and the like are pulled from the remainder of said recyclable materials and sorted by size, and non-magnetic heavy materials such as glass and the like are collected at said heavy material collecting region.

2. The apparatus of claim 1, wherein:
   said conveying mechanism includes a stepped region whereat said recyclable materials are dropped, said vacuum inducing mechanism includes an inlet disposed at said stepped region.

3. The apparatus of claim 2, wherein:
   said conveying mechanism includes a first conveyor belt and a discharge end, and said magnetic element includes a magnetic pulley for said conveyor at said discharge end, said inlet conveyor belt running over the top of said magnetic pulley and down around and under said magnetic pulley;
   a second conveyor disposed beneath said first conveyor belt at said discharge end and extending to said stepped region, and a magnetic material collecting region disposed beneath said first conveyor belt after said magnetic pulley, whereby said magnetic materials are carried around said magnetic pulley and separate from said first conveyor belt after said magnetic pulley, and the remainder of said recyclable materials are discharged onto said second conveyor to be conveyed to said stepped region.

4. The apparatus of claim 3, further comprising:
   a magnetic material collecting conveyor disposed at said magnetic material collecting region.

5. The apparatus of claim 4, wherein:
   said size separator mechanism includes a rod conveyor comprising a plurality of spaced rods, and a small object collecting region disposed beneath said rods.

6. The apparatus of claim 5, further comprising:
   a small object conveyor disposed at said small object collecting region.

7. The apparatus of claim 2, wherein:
   said vacuum inducing mechanism includes an enlarged chamber with said inlet opening into said enlarged chamber;
   a light object conveyor mounted on said frame and said enlarged chamber discharging onto said light object conveyor, said light object conveyor discharging at a light object collecting region.

8. The apparatus of claim 7, wherein:
   said light object conveyor includes said size sorting mechanism.

9. The apparatus of claim 1, wherein:
   said size separator mechanism includes a rod conveyor comprising a plurality of spaced rods, and a small object collecting region disposed beneath said rods.

10. The apparatus of claim 9, further comprising:
    a small object conveyor disposed at said small object collecting region.

11. The apparatus of claim 1, wherein:
    said conveying mechanism includes an inlet conveyor, a magnetic material conveyor disposed to convey magnetic material away from said magnetic element, a lighter weight object conveyor disposed to convey lighter weight objects away from said vacuum inducing mechanism, and a heavy material conveyor disposed to convey heavy material away from said vacuum inducing mechanism.

12. The apparatus of claim 11, further comprising:
    a small object conveyor disposed to convey small objects away from said size separator mechanism.

13. A method of separating recyclable objects comprising:
    providing a flow of recyclable objects;
    applying a magnetic field to said recyclable object flow and thereby separating magnetic objects from said recyclable object flow;
    collecting said magnetic objects at a magnetic object collecting region;
    applying a vacuum to said recyclable object flow and thereby separating lighter objects from said recyclable object flow;
    sorting said lighter objects by size;
    collecting said lighter objects at a plurality of light object collecting regions;
    collecting the remainder of said recyclable object flow at a non-magnetic, heavy object collecting region.

14. The method of claim 13, further comprising:
    dropping said recyclable objects at a drop region;
    said vacuum applying step including applying said vacuum at said drop region.

15. The method of claim 14, wherein:
    said vacuum applying step includes providing a generally enclosed chamber, applying said vacuum so as to draw said lighter object into said enclosed chamber, and discharging said lighter objects from said enclosed chamber.

16. The method of claim 13, wherein:
    said providing step includes providing a recyclable object conveyor;

said magnetic field applying step includes applying said magnetic field at a preselected magnetic zone on the underside of said conveyor, conveying said magnetic objects through said magnetic zone and away from said magnetic zone such that said magnetic objects fall from said conveyor;

said vacuum applying step is performed after said magnetic field applying step.

17. An apparatus for storing recyclable objects, comprising:

a frame;

a first conveyor having a discharge end and a magnetic pulley at said discharge end, said conveyor running over, around and under said magnetic pulley;

a second conveyor disposed at said first conveyor discharge end, and adapted so that said first conveyor discharges onto said second conveyor, said second conveyor having a discharge end disposed above a third conveyor, and said second conveyor adapted to discharge onto said third conveyor;

a magnetic object collecting region disposed beneath said first conveyor and after said magnetic pulley, whereby magnetic objects are magnetically adhered to said first conveyor at said discharge end and as said magnetic objects are conveyed away from said magnetic pulley said magnetic objects fall to said magnetic objects collecting region;

a vacuum mechanism mounted on said frame and having an inlet disposed adjacent said second conveyor, said vacuum mechanism adapted to pull lighter weight objects from the remainder of said recyclable objects, said vacuum mechanism including an enlarged plenum with said inlet opening into said plenum, said vacuum mechanism inlet disposed adjacent said second conveyor discharge end and said third conveyor;

a fourth conveyor mounted on said frame and disposed to carry lighter objects away from said plenum, said fourth conveyor being a rod conveyor having a plurality of spaced rods;

a fifth conveyor disposed at least partially beneath said fourth conveyor.

* * * * *

UNITED STATES PATENT AND TRADEMARK OFFICE
CERTIFICATE OF CORRECTION

PATENT NO. : 4,929,342

DATED : May 29, 1990

INVENTOR(S) : Gerald Johnston

It is certified that error appears in the above-identified patent and that said Letters Patent is hereby corrected as shown below:

```
Title Page:
In the Abstract, Line 2
"pulleys" should be --pulley--

Column 3, Line 6
"ar" should be --are--

Column 7, Claim 17, Line 10
"storing" should be --sorting--

Column 8, Claim 17, Line 18
After "lighter" insert --weight--
```

Signed and Sealed this

Twentieth Day of October, 1992

*Attest:*

DOUGLAS B. COMER

*Attesting Officer*   Acting Commissioner of Patents and Trademarks